United States Patent
Gryskiewicz et al.

(10) Patent No.: US 6,392,712 B1
(45) Date of Patent: May 21, 2002

(54) SYNCHRONIZING INTERLACED AND PROGRESSIVE VIDEO SIGNALS

(75) Inventors: Paul S. Gryskiewicz; Pranav H. Mehta, both of Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/540,694

(22) Filed: Mar. 31, 2000

(51) Int. Cl.$^7$ .............................. H04N 9/74; H04N 7/01
(52) U.S. Cl. ...................................... 348/584; 348/448
(58) Field of Search ............................... 348/441, 446, 348/448, 589, 600, 584; H04N 9/74, 9/76, 7/01

(56) References Cited

U.S. PATENT DOCUMENTS

| | | | | |
|---|---|---|---|---|
| 4,720,745 A | * | 1/1988 | DeForest et al. | 348/448 |
| 5,327,156 A | * | 7/1994 | Masukane et al. | 345/547 |
| 5,457,499 A | * | 10/1995 | Lim | 348/460 |

OTHER PUBLICATIONS

U.S. Patent Application Ser. No. 09/0268,017 filed Mar. 15, entitled "Conversion of Video Data".

* cited by examiner

Primary Examiner—Sherrie Hsia
(74) Attorney, Agent, or Firm—Trop, Pruner & Hu, P.C.

(57) ABSTRACT

An interlaced video signal may be combined with a progressive video signal, such as a graphics signal, by converting the interlaced video signal into a progressive signal. A new frame of the converted progressive signal is constructed from each field of the interlaced signal. The graphics signal is interlaced, then combined with the converted progressive signal. The combined signals may then be transmitted to a display, such as a television set. The interlaced video signal, which is transmitted at twice its incoming speed, remains temporally correct so that operations, such as scaling and 3:2 pulldown, may be performed with minimal resulting artifacts. The small amount of memory used to combine the signals may be embedded in the receiver circuitry.

21 Claims, 7 Drawing Sheets

SYNCHRONIZING INTERLACED AND PROGRESSIVE VIDEO SIGNALS

BACKGROUND

This application relates generally to video signals and particularly to progressive and interlaced video signals.

The National Television Systems Committee (NTSC) established a standard for interlaced display of television signals in the United States. In 1941, a monochrome standard (NTSC-I) was established; a color standard (NTSC-II) was established in 1953. The NTSC standard is maintained by the Electronics Industries Alliance (EIA). In Europe, the dominant television standard is known as Phase Alternating Line (PAL). Under both television standards, video signals are displayed by transmitting fields consisting of odd lines and even lines, to the screen. One difference between NTSC & PAL is that NTSC uses a 60 Hz refresh rate while PAL uses a 50 Hz refresh rate.

With this understanding, a typical video camera records video signals as a series of alternating fields: an odd field followed by an even field, for example. One odd field plus one even field constitutes a frame of the video signal. At a frame rate of thirty frames per second, each field is thus captured in successive time periods of 1/60th of a second. Thus, if the odd field of a frame is captured in a first time period, the even field is captured in a second time period, 1/60th of a second later.

So, an image recorded by a video camera may be sent to a television receiver as a video signal. The receiver may send fields to the display, one after another, just as the fields were recorded by the video camera.

A second standard is typically used for the display of an image upon a computer monitor. On most computer monitors, a frame of an image is displayed by starting from the top left of the frame, and, scanning from left to right, displaying each line of the image onto the computer screen, from the first to the last line, until the entire frame of the image has been displayed on the screen.

A progressive scan video camera likewise records each frame of an image by scanning the frame from left to right, for each line, and scanning from top to bottom the entire frame. A camera of this type typically records sixty frames in a second. Recording an image in this manner is well-suited for ultimate display on a computer monitor. The display of progressive video on a personal computer is sometimes called PC graphics.

It is possible for a video signal recorded in an interlaced fashion to be displayed on a personal computer monitor. Likewise, it is possible for a progressively scanned video signal to be displayed on a television screen. In both cases, some conversion of the stored signal such that the signal may be displayed is appropriate.

Environments exist where an interlaced video signal may be combined with a progressively scanned video signal. For example, a receiver may wish to add a progressive signal, such as a graphics overlay, to a video signal, such as a television program. The video signal may be combined with the graphics overlay to produce a new signal suitable for viewing.

To combine the two signals, the odd and even fields of each frame of the interlaced video signal may be "de-interlaced," or combined as a single, progressive, frame. The progressive frame may then be combined with another progressive frame, such as the graphics overlay. Alternatively, a progressive frame may be translated into an interlaced signal and combined with another interlaced video signal.

An interlaced video data stream typically transmits at 60 fields/second. A progressive data stream typically transmits at 60 frames/second, which is twice the rate of the interlaced video data stream.

To combine the data streams in real time, a frame buffer may receive the incoming video data streams such that the streams may be synchronized. For example, a frame buffer which stores three frames of video data, one frame for de-interlacing two fields of video, one frame for buffering the next fields, and one to buffer the graphics, may perform such synchronization.

However, frame buffer memory is not cheap. For example, under the NTSC standard, a single frame of active video data includes 480 lines of 720 pixels/line. If each pixel is described using two bytes of memory, a single stored frame of NTSC video occupies 700 Kbytes of memory. Merely storing two frames of video data for performing the above synchronization, therefore, requires 1.4 Mbytes of memory. Likewise, to store two frames for a PAL system, almost 1.7 Mbytes of memory is used.

If a progressive video signal is interlaced in order to combine with another interlaced video signal, the interlacing may introduce undesirable artifacts into the resulting image. This is particularly true for graphics images, which are higher frequency in nature than video signals which drive an interlaced television. This form of combining is thus inadequate for many real-time applications.

Thus, a need exists for an improved method of synchronizing an interlaced video signal with a progressive video signal without unduly degrading the signals.

BRIEF DESCRIPTION ON THE DRAWINGS

DETAILED DESCRIPTION

The following describes a system for processing video signals. For purposes of explanation, specific embodiments are set forth to provide a thorough understanding of the invention. However, it will be understood by one skilled in the art that the invention may be practiced without the particular details described herein. Further, although the embodiments are described in terms of the NTSC television standard, the illustrated system may be applied to other television standards, including, but not limited to the PAL television standard. Moreover, well-known elements, devices, process steps, and the like, are not set forth in detail in order to avoid obscuring the invention.

According to one embodiment of the invention, a system receives both an interlaced video data stream and a progressive video data stream. The data streams originate at different data rates, but are transmitted simultaneously, such that they may be combined at a receiver, if desired, and sent as a single video signal to a display. In one embodiment of the invention, the interlaced video data stream is sped up to match the data rate of the progressive video data stream, so that the streams may be combined.

Figure 1:
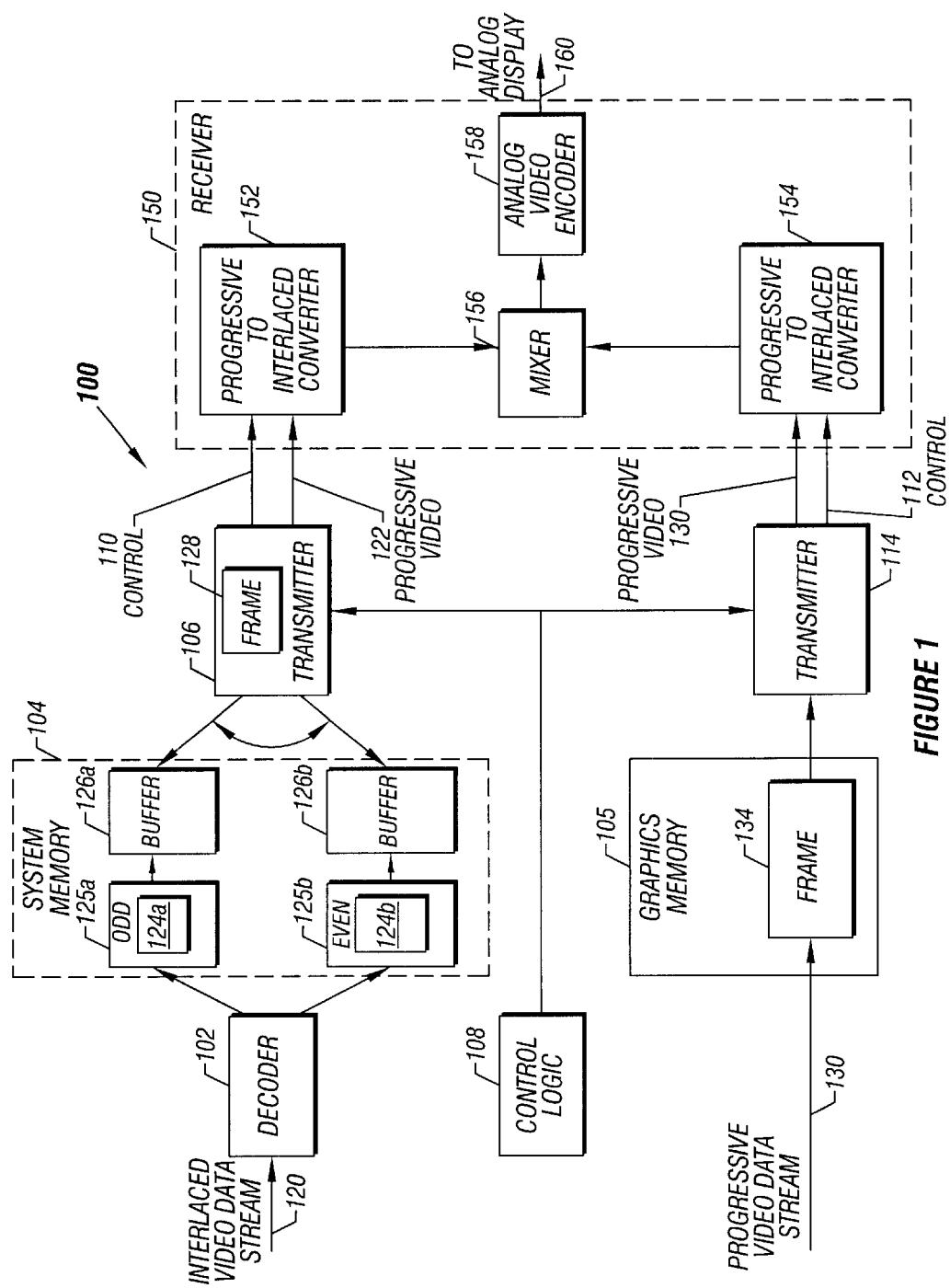
FIG. 1 is a block diagram of a system according to one embodiment of the invention.

In FIG. 1, a system 100 may receive both an interlaced video data stream 120 and a progressive video data stream 130. In one embodiment of the invention, the interlaced video data stream 120 is de-interlaced, then converted to a progressive video data stream 122 prior to transmission to a receiver 150.

For processing the interlaced video data stream 120, in one embodiment of the invention, the system 100 includes a decoder 102, a memory 104 and a transmitter 106. These elements operate, along with a control block 108, to produce the progressive video stream 122.

The decoder 102 decodes the interlaced video data stream 120 into a plurality of odd fields 124a and even fields 124b. In one embodiment of the invention, the decoder 102 receives a new odd field 124a every $1/60^{th}$ of a second. Likewise, a new even field 124b is received by the decoder 102 every $1/60^{th}$ of a second.

The odd field 124a and the even field 124b are stored in a system memory 104. The system memory 104 may comprise various types of random access memories, such as dynamic random access memories (DRAMs), synchronous DRAMs (SDRAMs), static RAMs (SRAMs), single in-line memory modules (SIMMs), or double in-line memory modules (DIMMs), to name a few.

In one embodiment, the memory 104 includes a first buffer comprising odd 125a and even 125b portions, for receiving the odd field 124a and even field 124b, from the decoder 102. The memory 104 further includes a second buffer, comprising odd 126a and even 126b portions, for sending the odd field 124a and the even field 124b to the transmitter 106.

The transmitter 106 receives, in an alternating sequence, each of the odd field streams 124a and the even field stream 124b. As described further, below, the transmitter 106 combines the data from the odd field 124a and the even field 124b into a progressive frame 122 for transmission to the receiver 150.

Simultaneously with the receipt of the interlaced video data stream 120, the system 100 may receive a progressive video data stream 130. In one embodiment of the invention, a plurality of successive frames 134 of the data stream 130 are each received into a graphics memory 105 before being sent to a second transmitter 114. The graphics memory 105 could be physically located in the main memory 104. Alternatively, the two transmitters 106 and 114 of the system 100 may be combined as one.

The control block 108 provides synchronization signals, field information, and timing information, to be received by each transmitter 106 and 114 and, subsequently, by the receiver 150. For example, the control block 108 may produce a clock pulse such that each transmitter 106 and 114 may coordinate transmission with the other. The field information indicates which field, even or odd, is being transmitted. In one embodiment of the invention, the transmitter 106 sends a control signal 110 to the receiver 150 while the transmitter 114 sends a control signal 112 to the receiver 150. The control signals 110 and 112 include synchronization, field, and other timing information.

In FIG. 1, the receiver 150 receives the two progressive video signals 122 and 130, as well as the control signals 110 and 112. However, in one embodiment of the invention, the receiver 150 sends a video signal 160 to an analog display (not shown), such as a television. Television displays typically receive video transmissions as a sequence of fields of alternating odd and even information, that is, an interlaced video signal. Thus, in one embodiment of the invention, the receiver 150 includes a pair of progressive-to-interlaced converters 152 and 154, each of which receive the progressive video signals 122 and 130, respectively, as well as the control signals 110 and 112, respectively.

Further, in one embodiment of the invention, the receiver 150 includes a mixer 156 as well as an analog video encoder 158, which produce a signal 160, for receipt by the analog display. The receiver 150 is described in more detail, below.

The system 100 may receive video data streams 120 and 130, one interlaced, the other progressive, and synchronize them such that they may be combined in the receiver 150. The synchronization involves at least two issues: the difference in data rate between the data streams 120 and 130 and the difference in size of the transmissions.

To review, an interlaced video data stream, such as the incoming video data stream 120, typically transmits a single field in a given time period. For example, an odd field may be transmitted in a first time period, followed by the transmission of an even field in a second time period. The odd and the even fields together constitute a frame of the video stream 120. The process continues, alternating between odd and even fields, until the entire data stream is transmitted. At a typical frame rate of 30 frames per second, each field is transmitted in time periods of $1/60^{th}$ of a second each (60 Hz field rate).

A progressive video data stream, such as the incoming video data stream 130, typically transmits an entire frame in a given time period. The frame is essentially twice the size of a field, such as those for interlaced transmissions. At a typical frame rate of 60 frames per second, progressive video data typically transmits twice as much data as interlaced video data in a given time period.

Figure 2:
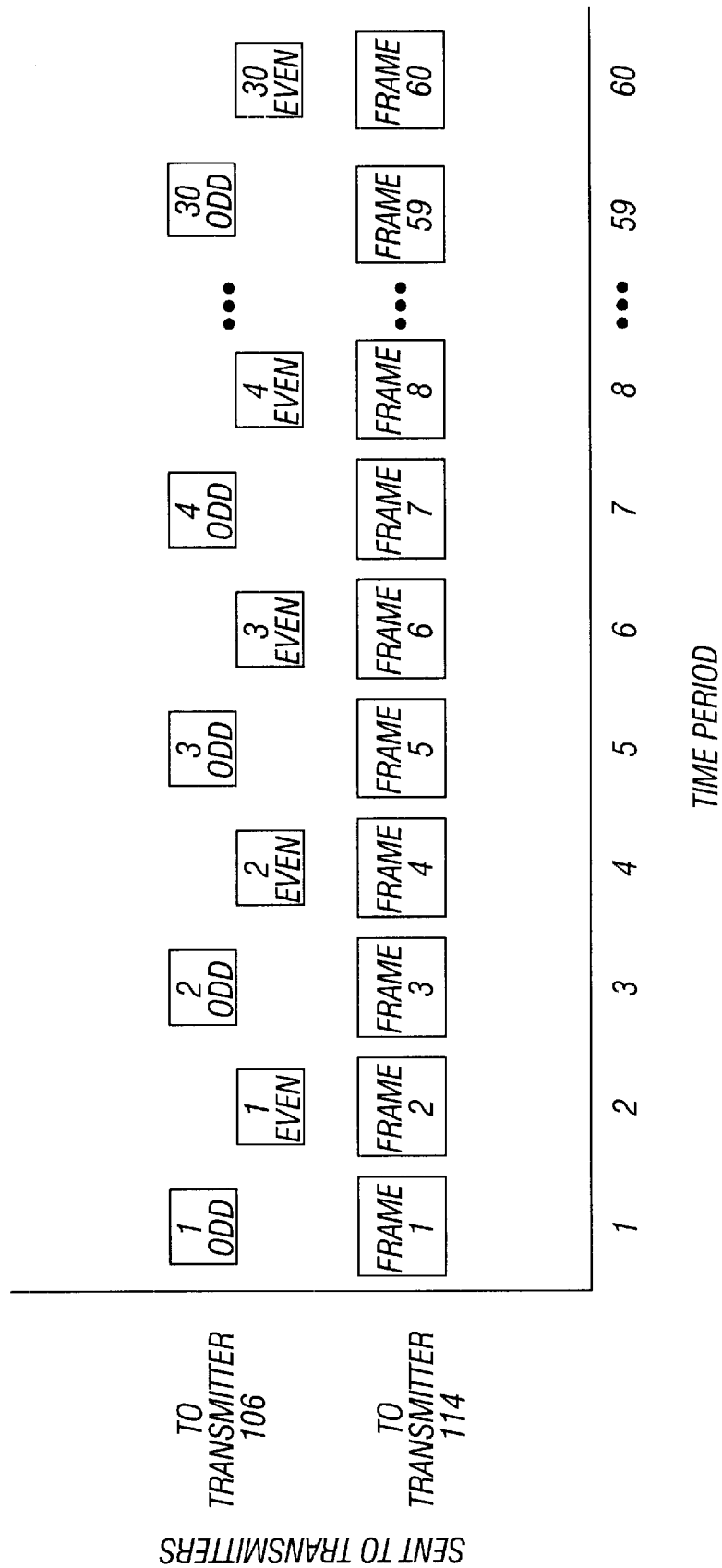
FIG. 2 is a graph of signals sent to the transmitters during a given time period according to one embodiment of the invention.

The difference between the two data streams 120 and 130, both in size and in transmission rate, is depicted in the graph of FIG. 2. The graph plots the portions of the interlaced and progressive video signals 120 and 130 sent to the transmitters 106 and 114 against a given time period. For a time period of $1/60^{th}$ of a second, the graph illustrates receipts by the transmitters 106 and 114 for one second.

In the first time period, the transmitter 106 receives an odd field of a first frame of interlaced video. Simultaneously, the transmitter 114 receives a first frame of progressive video. Thus, in the first time period, the transmitter 114 receives twice as much data as the transmitter 106.

In the second time period, the transmitter 106 receives an even field of the first frame of interlaced video. Simultaneously, the transmitter 114 receives a second frame of progressive video. Again, the transmitter 114 has received twice as much data as the transmitter 106.

The interlaced data stream 120 and the progressive data stream 130 thus transmit at a different rate and in different amounts. The two data streams 120 and 130 may be synchronized in a number of ways. For one, the faster data stream (the progressive stream 130) may be reduced to half its normal transmission rate, or to 60 fields per second. Because of the nature of PC graphics, however, reducing the rate of transmission may be undesirable.

Thus, in one embodiment of the invention, the synchronization of the slower interlaced video data stream 120 and the faster progressive video data stream 130 is achieved by increasing the data rate of the interlaced video data stream 120. Further, the size of the transmission is increased to match that of the progressive video data stream 130. To speed up the interlaced video data stream 120, the transmitter 106, in each time period, receives a field 124a or 124b, but transmits a frame 128.

The transmitter 106 receives a new field, either an odd field 124a or an even field 124b from the memory 104, during each time period. Also during each time period, the transmitter 106 constructs a new frame 128 from the received fields 124a and 124b, then sends the frame 128 to the receiver 150.

In one embodiment, the transmitter 106 includes no internal memory. Instead, the transmitter 106 retrieves from the memory 104 and sends the data directly to the receiver 150. By selectively retrieving fields 124a and 124b from the memory 104, such as from the second buffer, the transmitter 106 may "construct" a progressive video data sequence 122 comprising a plurality of frames 128.

Figure 3:
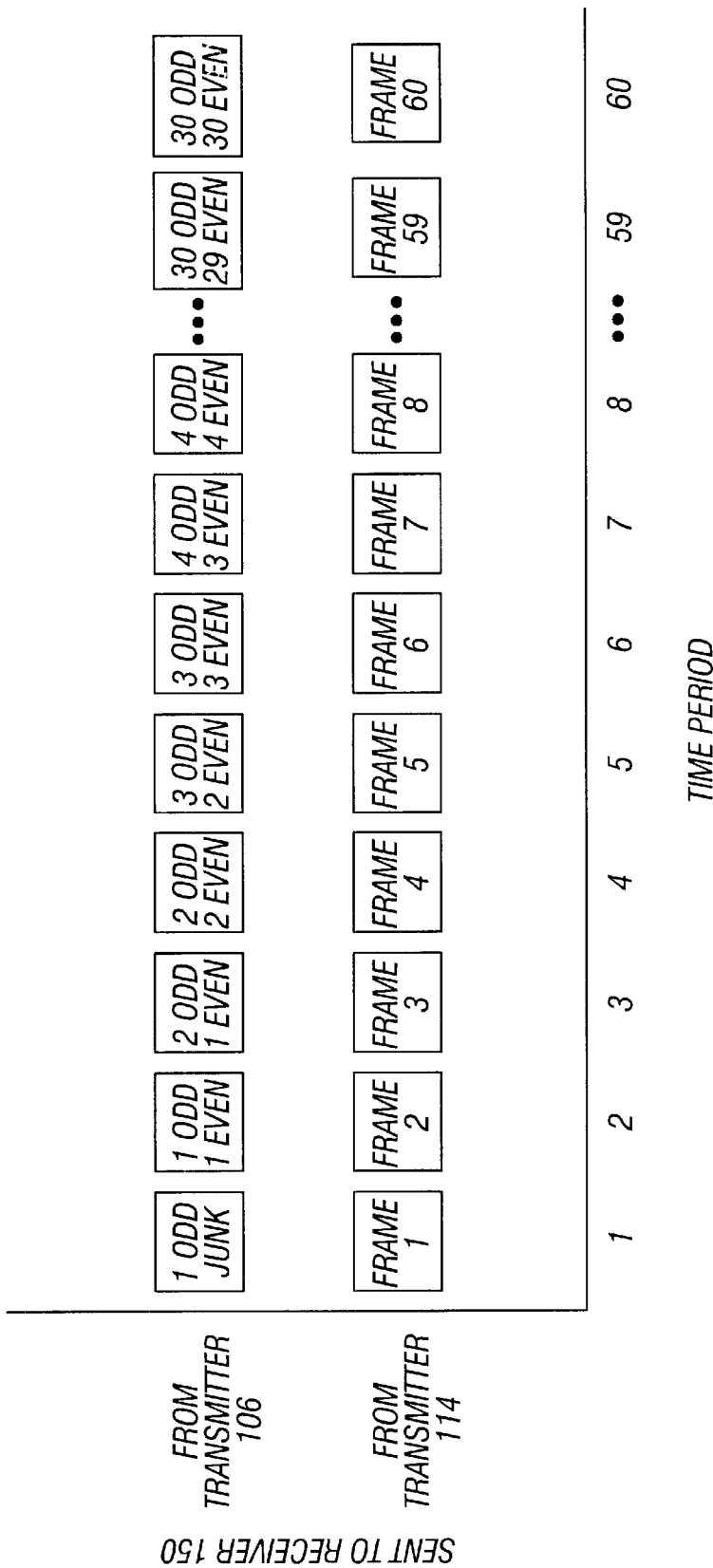
FIG. 3 is a graph of signals being sent from the transmitters during a given time period according to one embodiment of the invention.

In a first time period, the transmitter 106 retrieves the contents of the odd field 124a from the buffer 126a. The transmitter 106 likewise retrieves the contents of the even field 124b from the buffer 126b. In the first time period, the buffer 126b has unknown, or "junk," data. Nevertheless, the retrieved data is sent to the receiver 150 by the transmitter 106 as a frame 128 of data, in the first time period, as shown in FIG. 3. As long as the filed information is preserved, the correct field is displayed and the "junk" field is discarded. This may be advantageous for operations such as scaling. Scaling operations are described in more detail, below.

In a second time period, the transmitter 106 retrieves the contents of the even field 124b from the buffer 126b. By the second time period, the decoder 102 has sent new data to the first buffer 125b, which is then sent to the second buffer 126b. The transmitter 106 thus sends the even field 124b and the odd field 124b as a new frame 128, as shown in FIG. 3.

From time period to time period, half of each frame 128 includes "new" information, that is, information retrieved within a given time period. The other half of the frame 128 contains "old" information, which is information retrieved in the preceding time period. The frame 128 thus includes entirely "new" information every other time period, or, in one embodiment of the invention, every ⅟30th of a second.

By constructing a frame 128 in this manner, the transmitter 106 may send each frame 128 out during each time period. The transmitter 106 receives information from both fields, one line at a time, alternating between odd fields 124a and even fields 124b. This, in effect, deinterlaces the two interlaced fields 124a and 124b into a progressive frame 128.

By sending the most current odd/even field pairs, the receiver 150 has access to the entire frame in the case of scaling, or re-sizing the video in some way. Operations to scale a video image typically produce fewer artifacts when performed on frames rather than on fields. To scale the video signal, a simple weave may be performed, such as by combining the lines, as described above. Since all lines are transmitted sequentially, the receiver 150 does not need a frame buffer to store the lines. Instead, the scaler can work "on the fly." Scaling in this manner is far superior to scaling on only fields.

The formerly interlaced data stream 120 may be synchronized with the progressive video data stream 130. In one embodiment of the invention, the progressive stream 130 is received by the transmitter 114 at a 60 Hz frame rate. The interlaced stream 120 is received by the transmitter 106, in the form of alternating odd fields 124a and even fields 124b, at 60 fields per second, for a 30 Hz frame rate. However, the transmitter 106 constructs a new frame 128 each time period and thus transmits at a 60 Hz frame rate, to keep up with the frame rate of the transmitter 114.

In FIG. 3, a graph plots the transmission to the receiver 150 (FIG. 1) from each transmitter 106 and 114 against a given time period, according to one embodiment of the invention. At a typical frame rate of 60 Hz, the graph shows the transmissions over a one second time period.

In one embodiment of the invention, no information is sent to the receiver 150 during the first time period. During this time, the memory 104 buffers two fields of information, a first odd field 124a and a first even field 124b before a frame 128 is constructed. In a second embodiment of the invention, a frame 128 is constructed using only information from a single odd field 124a. The even rows of the frame 128 in this embodiment thus contain spurious information.

In the second time period, a first odd field is coupled with a first even field. This combination is retrieved by the transmitter 106 as the first frame 128 to the receiver 150. Likewise, the receiver 150 receives a first frame 134 ("frame 1") of information from the transmitter 114 during the same time period.

In the third time period, a second odd field and the first even field are retrieved by the transmitter 106 and sent as the second frame 128 to the receiver 150. Notice that the second frame 128 includes the same even field information as the first frame 128. Even though the even field is transmitted twice, the newer odd field will ultimately be displayed while the even field is ignored. At the same time, the transmitter 114 sends "frame 2" to the receiver 150.

Next, the second odd field and the second even field are retrieved by the transmitter 106 and transmitted as the third frame to the receiver 150. Likewise, the transmitter 114 transmits "frame 3" during this time period.

In one embodiment of the invention, the receiver 150 accepts the two video data streams 122 and 130 at a frame rate of 60 Hz. A signal 160, to be sent to an analog display (not shown) typically sends video data at a rate of 60 fields per second, or a frame rate of 30 Hz.

Additionally, the video data streams 122 and 130 are progressive. Most analog displays, however, receive signals in an interlaced sequence of alternating odd and even fields.

Finally, the original interlaced video data stream 120 was converted to a progressive signal 122 and synchronized with the progressive signal 130 so that the two signals 122 and 130, after being interlaced, could be combined together before displaying.

With these considerations in mind, a receiver 150 according to one embodiment of the invention, includes circuitry for converting the data streams 122 and 130 from progressive to interlaced form and a mixer 156 for combining the signals as one. Further, the receiver 150 uses the control signals 110 and 112, which include synchronization and field information, to send a single field 124 or 174 to the mixer 156 during each time period. The receiver 150 thus effectively converts incoming signals 122 and 130, at a 60 Hz frame rate, to a single outgoing signal 160 at a 60 Hz field rate, or a 30 Hz frame rate.

Figure 4:
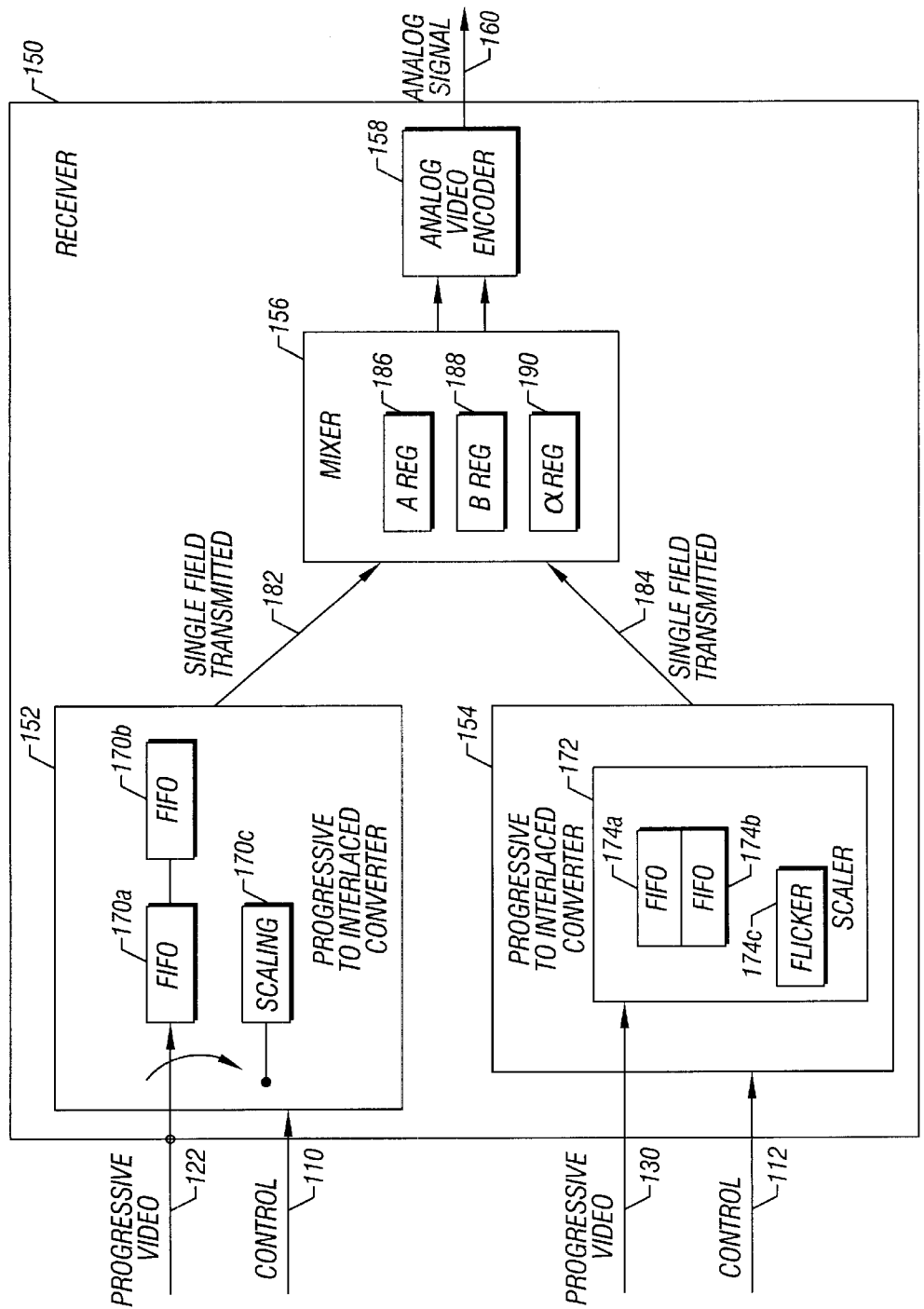
FIG. 4 is a block diagram of a receiver according to one embodiment of the invention.

In FIG. 4, the receiver 150, according to one embodiment of the invention, includes two progressive to interlaced converters 152 and 154, for receiving the progressive video 122 and the progressive video 130, respectively. In other embodiments, these blocks 152 and 154 may be combined as a single unit.

In the progressive-to-interlaced converter 152, the progressive video data stream 122 is received as a plurality of frames 128, one for each time period. To convert the progressive video data stream 122 into an interlaced video data stream, one implementation may be to include a memory for storing the frame 128, as well as the odd and even fields constructed from the frame 128, as part of the receiver 150.

Instead, in one embodiment, the progressive-to-interlaced converter 152 includes two first-in-first-out (FIFO) line buffers 170a and 170b. Each FIFO line buffer may accept up to a single line of the incoming frame 128. The progressive-to-interlaced converter 152 thus may convert the progressive data stream 122 into an interlaced data stream "on the fly," with only minimal use of memory.

Figure 5:
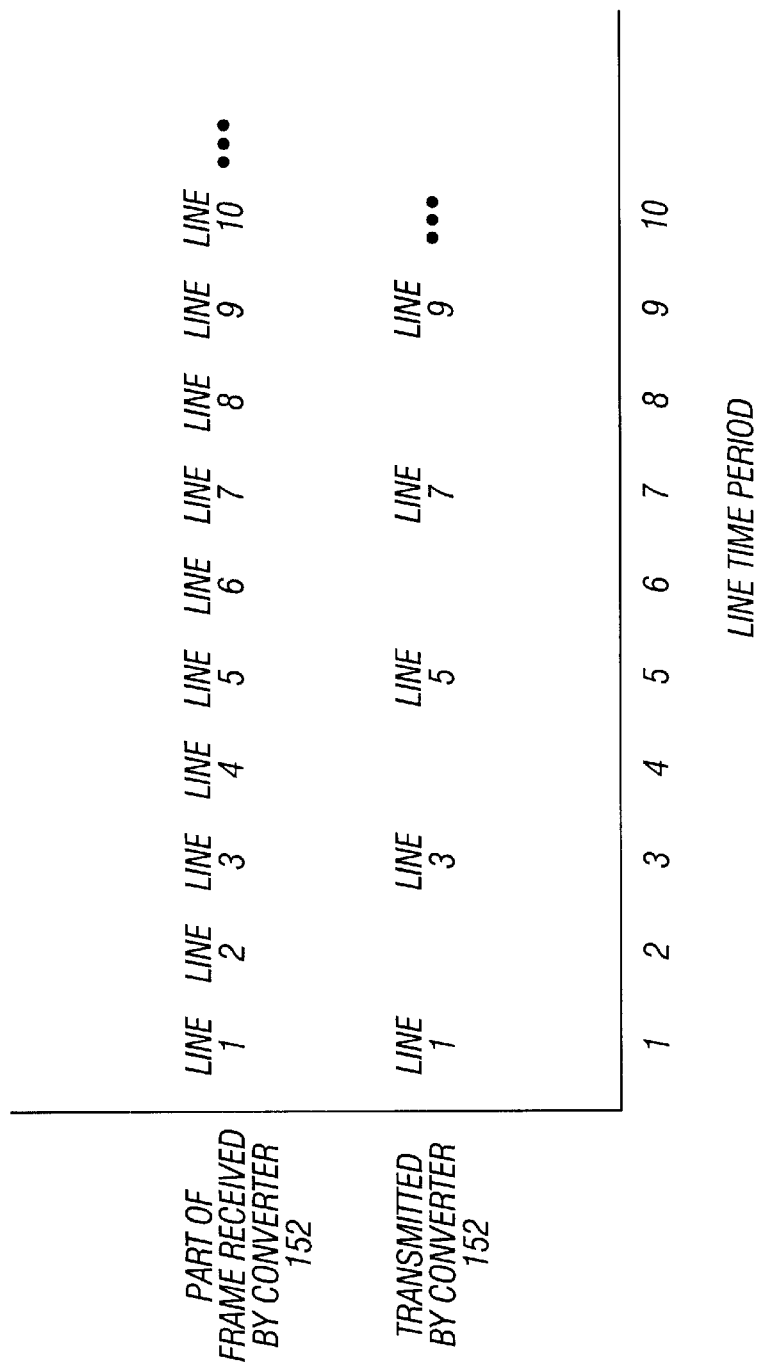
FIG. 5 is a graph of incoming and outgoing signals of the converter according to one embodiment of the invention.

Typically, a video signal is transmitted one line at a time. Thus, the time it takes to transmit a line of video may be described as a line time period (LTP). In FIG. 5, a graph illustrates the signals coming into and going out of the progressive-to-interlaced converter 152.

In a first LTP, the line buffer FIFO 170a receives a first line of the frame 128, such as a first odd line. In one embodiment, the line buffer FIFO 170a sends out the data during the first LTP. Next, the progressive-to-interlaced converter 152 receives the next even (odd) line. In one embodiment, the first line of the frame 128 is still being transmitted, so the newly received second line is ignored. However, if the video stream is being scaled, the ignored second line may be retained and used for the scaling operation, as explained further below.

The line buffer FIFO 170a continues to receive each line of the frame 128 in turn. However, because the interlaced data is running at half the rate of the progressive data, only the odd lines (or the even lines) are transmitted. The progressive-to-interlaced converter 152 uses the control signal 110 it receives to synchronize its transmission rate.

As illustrated by the embodiment of FIG. 5, by slowing down the transmission from the line buffer FIFO 170a, only every other line is transmitted. The effect is to convert the progressive video data stream 122 into an interlaced video data stream 182.

In one embodiment, video is streamed to the progressive-to-interlaced converter 152 at twice the rate that video is transmitted out. While one line is still being transmitted out, a subsequent line is received, but, ultimately, ignored.

In one embodiment, the progressive-to-interlaced converter 152 further includes a second line buffer FIFO 170b. This FIFO 170b may be programmed with a fixed delay, depending upon the operations performed, as explained further, below.

In one embodiment, the progressive-to-interlaced converter 152 also includes a third line buffer FIFO, a scaling FIFO 170c. The scaling FIFO 170c may be used during scaling operations to save the line of video that, during non-scaling operations, would ultimately be discarded.

In FIG. 4, suppose a first odd line of the progressive video data stream 122 is received into the line buffer FIFO 170a, then sent to the line buffer FIFO 170b. The a second even line may then be received by the line buffer FIFO 170a. However, as explained above, the even line is ignored. Alternatively, in one embodiment, the even line may be received by the scaling FIFO 170c, as shown by the swinging arrow in FIG. 4. In this way, a scaling operation may be performed on the entire frame of the incoming video data 122, even though only half of the incoming data is otherwise used.

The progressive-to-interlaced converter 154 likewise receives the progressive video data stream 130 as a plurality of frames 134, also transmitted one per time period. Like the progressive-to-interlaced converter 152, the progressive-to-interlaced converter 154 includes a line buffer FIFO 174a, for receiving lines of the frame 134 from the progressive video data stream 130 and producing an interlaced video data stream 184.

However, the progressive-to-interlaced converter 154 further includes a scaler 172, in one embodiment. Recall that progressive video data is typically displayed on computer monitors. Unlike computer monitors, television displays typically display less than the entire frame of a video image.

Thus, to prepare a progressive video data stream for an analog television display, some portion of the image is scaled down, both vertically and horizontally. In one embodiment, the scaler 172 may scale down the incoming progressive video data 130 using two line buffer FIFOs 174a and 174b.

Also, because graphics is usually intended to be viewed on a computer monitor, if it is instead displayed on a television monitor, the graphics image may have objectionable flicker. Therefore, in some embodiments, the progressive-to-interlaced converter 154 may include a third line buffer FIFO, a flicker filter 174c. Using the flicker filter 174c, a filtering operation may be performed on the progressive video data stream 130, prior to being received by the analog display, to remove the flicker.

While the scaling operation is being performed, the progressive-to-interlaced converter 152 may use the second line buffer FIFO 170b to slow down transmission of the interlaced video data stream 182 such that it is synchronized with the interlaced video data stream 184 coming from the progressive-to-interlaced converter 154. Both converters 152 and 154 further may use the control information 110 and 112, respectively, to synchronize transmission of the video data streams 182 and 184.

The interlaced video data streams 182 and 184 are simultaneously transmitted to the mixer 156. In one embodiment of the invention, the mixer 156 includes an A register 186, for receiving a byte of the interlaced video data stream 182, a B register 188, for receiving a byte of the interlaced video data stream 184, and an register 190.

In one embodiment of the invention, the mixer 156 keeps a look-up table of weighted values, one for each pixel, which the mixer 156 uses to determine how each line of video data is added together. The register 190 stores these weighted values. For each operation, the register thus informs the mixer 156 how to combine the contents of the A register 186 and the B register 188. A weighted value of 0.5, for example, may tell the mixer 156 to add the A register 186 and the B register 188 together, that is, equally weight the two bytes of information. A weighted value of 1, in contrast, may indicate that the A register 186 is not used, while a weighted value of 0 indicates that the B register 188 is not used.

Once the operation performed in the mixer 156 is complete, the data may be sent to the analog video encoder 158, where it is converted to an analog signal 160.

Thus, according to one embodiment of the invention, the receiver 150 may receive a progressive video data stream 122 and a second progressive video data stream 130, combine the streams and transmit them to an analog display using six frame lines worth of memory. These frame lines provide temporary storage for buffering as well as being beneficial for scaling and for flicker filtering.

Because the FIFOs may be embedded into the receiver 150, the embodiment of FIG. 4 employs no external memory device. Such cost savings may thus extend the applications of the system 100 beyond high-end markets.

Recall that, by sending the latest odd field information with the latest even field information to the receiver 150, and thus creating a new frame 128 during each time period, the slower interlaced video data stream 120 was "sped up" as the progressive video data stream 122. In this manner, the time independence of each field 124a or 124b is preserved. By using the newest field 124a or 124b in each frame 128 that is transmitted, the de-interlaced frame is temporally correct.

Since the progressive video 122 was constructed at the transmitter 106 by producing a full frame 128 from a field 124a or 124b, the subsequent deconstruction of the frames 128 into fields 124a and 124b at the receiver 150 and the consequent slowing down of transmission to match the expected data rate of the display nevertheless results in the entire interlaced video signal 120 being experienced.

The same is not true, however, for the progressive video signal 130. Because the operations performed on the progressive video signal 130 did not result in the transmission of redundant information to the receiver 150 (see FIG. 3), in one embodiment of the invention, the slowing down of transmission at the receiver 150 causes half of the original progressive video signal 130 to become part of the interlaced analog signal 160 for ultimate display.

Particularly for applications where the progressive video signal 130 is a graphic overlay, to be added upon the incoming video data stream 120, this loss during transmission is not acute. Graphics video tends to involve less movement than television programs, for example, and graphics images may be constructed such that this loss is irrelevant. As one example, a graphic overlay may comprise a sequence of frames in which change occurs only every other frame.

Figure 6:
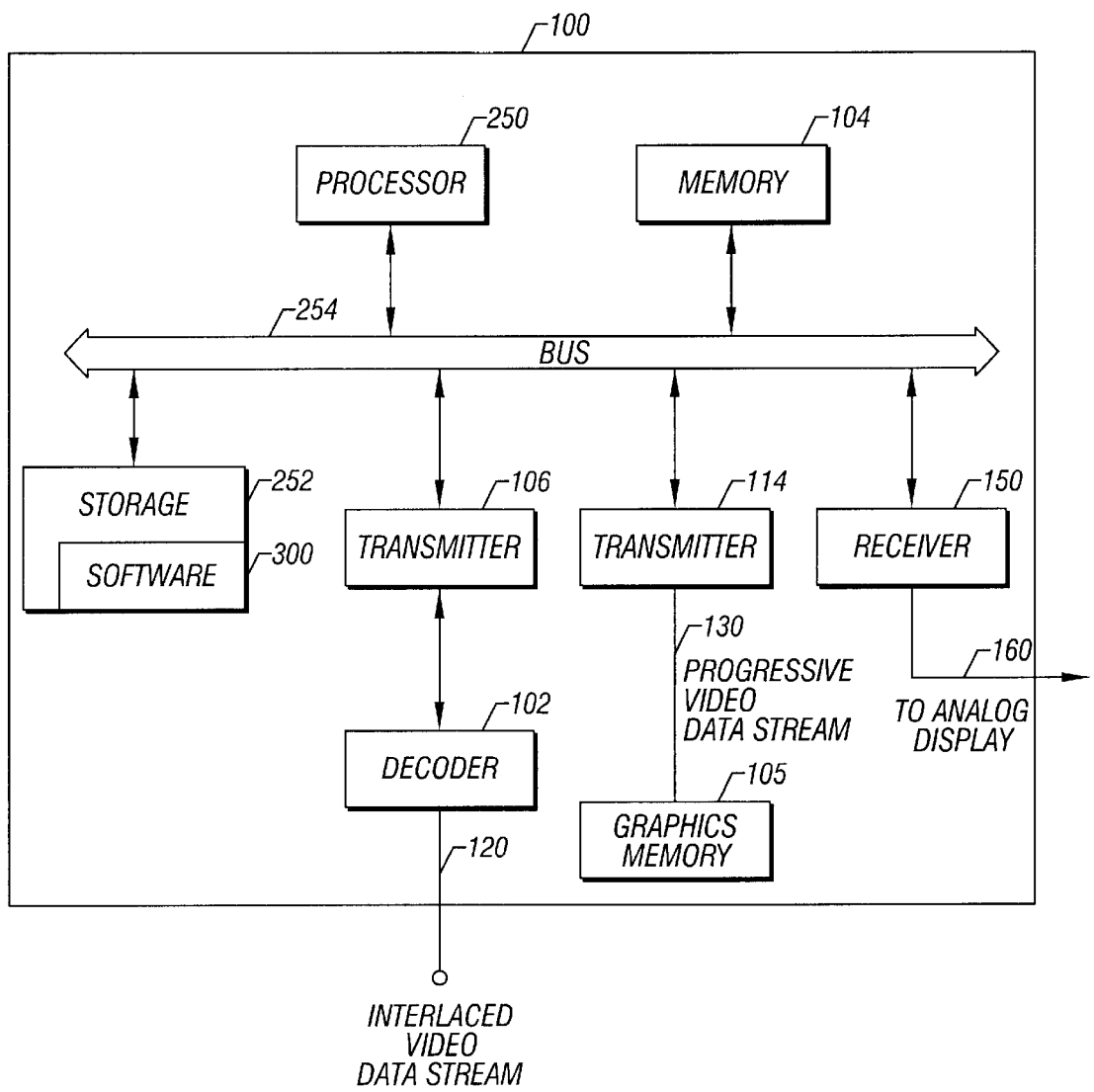
FIG. 6 is a block diagram of a processor-based system according to one embodiment of the invention.

In FIG. 6, the system 100 may be part of a processor-based system, such as a set-top box, according to one embodiment. A processor 250 is coupled to the memory 104, transmitters 106 and 114, and receiver 150 of FIG. 1 by a bus 254, such as a processor bus. The processor 250 may execute a software program 300, stored in a storage medium 252, such as a hard disk drive, to perform many of the aforementioned operations. In one embodiment, the progressive video data stream 130 is generated inside the graphics memory 105, while the interlaced video data stream 120 is received from outside the system 100.

Figure 7:
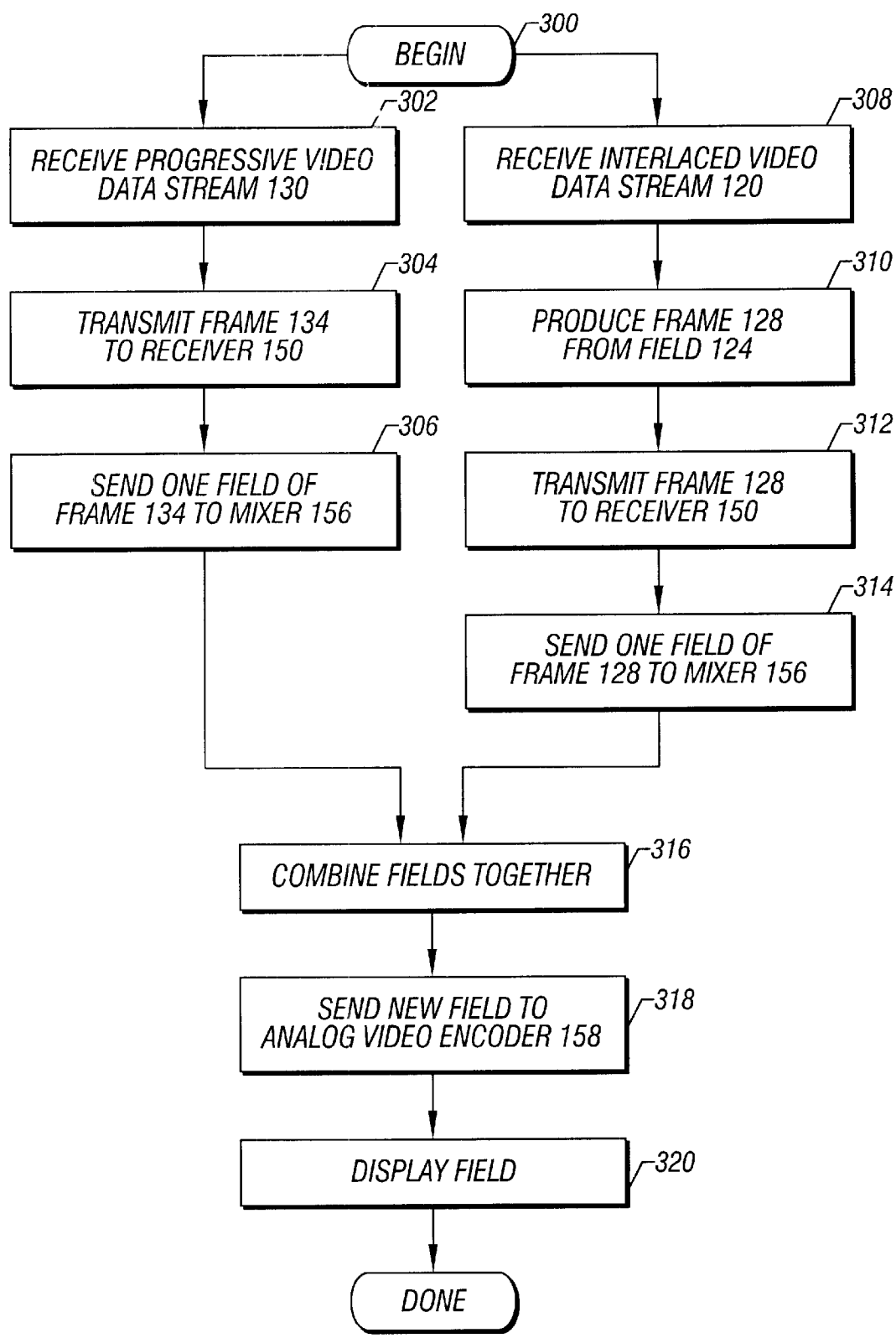
FIG. 7 is a flow diagram of operation of the system of FIG. 1 according to one embodiment of the invention.

FIG. 7 is a flow diagram illustrating the operation of the software program 300, according to one embodiment of the invention. The operations illustrated are performed upon each incoming frame of the two video data streams.

The system 100 receives the progressive video data stream 130 (block 302). Alternatively, the progressive video data stream 130 may be generated inside the system 100. Each frame 134 of the progressive video data stream 130 is transmitted to the receiver 150 (block 304). The frame 134 is then transmitted as a single field to the mixer 156 (block 306), to be combined with the interlaced video data stream 120, pixel by pixel.

The software program 300 may use the control block 108 (FIG. 1) to synchronize the above operations (blocks 302–308) with the following operations. The system 100 receives the interlaced video data stream 120 (block 308). The interlaced video 120 is received as odd and even fields 124a and 124b, then a frame 128 is produced from each field 124a or 124b (block 310). As explained above, this operation has the effect of doubling the rate of transmission of the interlaced data stream 120.

The newly constructed frame 128 is transmitted to the receiver 150 (block 312). There, each frame 128 is transmitted to the mixer 156 as a single field (block 314).

The two separate parts of the software program 300 merge at the mixer 156, where the fields 124a and 124b and 134 are combined (block 316). This combination may be performed line by line, as described above, such that the use of external frame buffer memory may be avoided. The newly constructed field may be sent to the analog video encoder 158, also as a sequence of field lines (block 318). The field may then be displayed (block 320).

Thus, in some embodiments of the invention, an interlaced video signal may be transmitted as a progressive video signal, such that the new signal may be combined with one or more other progressive video signals, without slowing down any signals and without the use of an external frame buffer. Further, in some embodiments, the combined signals may be transmitted to a display, such as a television set, in an interlaced fashion. The interlaced video signal which is transmitted at twice its incoming speed remains temporally correct so that operations, such as scaling, may be performed with minimal resulting artifacts in some embodiments. Where a small amount of memory is used to combine the signals, the memory may be embedded in the receiver circuitry in some embodiments. Where use of an external frame buffer is avoided, the cost of the system may be diminished in some embodiments.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method, comprising:

receiving an interlaced data stream comprising odd and even fields, wherein the odd and even fields are alternatively received in first and second time periods;

constructing a progressive frame comprising an odd field received in a second time period and an even field received in a first time period; and transmitting the progressive frame in the second time period.

2. The method of claim 1, further comprising:

constructing a second progressive frame comprising an even field received in a third time period and the odd field received in the second period; and transmitting the second progressive frame in the third time period.

3. The method of claim 2, further comprising:

receiving a progressive data stream comprising a plurality of additional frames, wherein one of the plurality of additional frames is received in a time period and transmitted in the same time period.

4. A method comprising:

receiving a first portion of a first frame of progressive data;

receiving a second portion of the first frame while transmitting the first portion of the first frame;

receiving a first portion of a second frame of progressive data; and receiving a second portion of the second frame while transmitting the first portion of the second frame.

5. The method of claim 4 including transmitting the first portion of the first frame and the second portion of the second frame to a mixer.

6. The method of claim 5 including receiving an even line of the first frame while transmitting an odd line of the first frame.

7. The method of claim 5 including discarding the second portion of the first frame.

8. The method of claim 7 including using the first portion of the first frame and the second portion of the first frame during scaling operations.

9. A system comprising:

a processor; and a storage, said storage storing instructions that enable the processor to receive an interlaced data stream comprising odd and even fields, wherein the odd and even fields are alternately received in first and second time periods, construct a progressive frame comprising an odd field received in the second time period and an even field received in a first time period, and transmit the progressive frame in the second time period.

10. The system of claim 9 wherein said storage stores one of a plurality of additional frames from a progressive data stream.

11. The system of claim 10 including a software program to construct the first and second frames.

12. A system comprising:

a processor; and a storage, said storage storing instructions that enable the processor to receive a first portion of a first frame of progressive data, receive a second portion of the first frame while transmitting the first portion of the first frame, receive a first portion of the second frame of progressive data, and receive a second portion of the second frame while transmitting the first portion of the second frame.

13. The system of claim 12 wherein said storage stores instructions that enable the processor to transmit the first portion of the first frame and the second portion of the second frame to a mixer.

14. The system of claim 13 wherein said storage stores instructions that enable the processor to receive an even line of the first frame while transmitting an odd line of the first frame.

15. An article comprising a medium storing instructions that enable a processor-based system to:

receive an interlaced data stream comprising odd and even fields, wherein the odd and even fields are alternatively received in first and second time periods;

construct a progressive frame comprising an odd field received in a second time period and an even field received in a first time period; and transmit the progressive frame in the second time period.

16. The article of claim 15 further storing instructions that enable the processor-based system to construct a second progressive frame comprising an even field received in a third time period and an odd field received in the second time period; and transmit the second progressive frame in the second time period.

17. An article comprising a medium storing instructions that enable a processor-based system to:

receive a first portion of a first frame of progressive data;

receive a second portion of the first frame while transmitting the first portion of the first frame;

receive a first portion of a second frame of progressive data; and receive a second portion of the second frame while transmitting the first portion of the second frame.

18. The article of claim 17 further storing instructions that enable the processor-based system to transmit the first portion of the first frame and the second portion of the second frame to a mixer.

19. The article of claim 18 further storing instructions that enable the processor-based system to receive an even line of the first frame while transmitting an odd line of the first frame.

20. The article of claim 17 further storing instructions that enable the processor-based system to describe the second portion of the first frame.

21. The article of claim 20 further storing instructions that enable the processor-based system to use the first portion of the first frame and the second portion of the first frame during scaling operations.

* * * * *